United States Patent Office 2,999,831
Patented Sept. 12, 1961

2,999,831
VULCANIZED RUBBER PRODUCT CONTAINING A METAL HYDRIDE AS AN ANTIOXIDANT
Hugh T. Stewart, Los Gatos, Calif., assignor to Stewart Development Company, San Fernando, Calif., a co-partnership
No Drawing. Filed June 26, 1957, Ser. No. 668,020
4 Claims. (Cl. 260—33.6)

This invention relates to antioxidants for use in rubber compositions.

The deterioration of vulcanized rubber products upon aging has long been a problem and the industry has sought to overcome the difficulty through the use of antioxidants incorporated in the rubber stock, both in natural and synthetic rubber. Heretofore practically all the chemicals used as antioxidants in this field have been either secondary aromatic amines or phenolic bodies or various combinations of both.

Among the disadvantages which attend the use of such chemicals are the following: they are often soluble in, or are otherwise extractable by, the various liquid materials with which the rubber goods come in contact. Thus, for example, when gaskets are used in oil lines in airplane engines and the like, the oil not only sometimes becomes badly discolored but the dissolved antioxidant chemicals from the rubber produce a sludge which tends to clog the lines. The same trouble results with hydraulic fluids. Alcohols, and other fluids often likewise extract the antioxidants from the rubber. Another difficulty is the decolorization which takes place in the rubber products themselves. Thus, a rubber product which contains polymerized trimethyl dihydroquinoline, a well known antioxidant for rubber goods, and which when freshly made is of a light gray color, turns to a brown color in a relatively short time upon exposure to air, such discoloration being attended with severe deterioration of the rubber as evidenced by the multitude of surface cracks that are present when the discolored rubber is stretched. The white sidewalls of automobile tires tend to become yellowish due to the migration of the antioxidant chemicals from the black rubber of the tires to the white walls. The staining of white enamel on the doors of refrigerators, and the discoloring of hospital rubber sheeting are other examples of disocloration which attends the use of present day antioxidants. In rubber products which are subjected to a great deal of stretching or other stress and strain the tendency to oxidize and deteriorate is increased and the life of such rubber products with present day antioxidants is relatively short. Similarly, with present day antioxidants rubber products which are subjected to heat, as in the case of packing material in steam plants, deteriorate at a rapid rate. And it is well known that the rubber tires of automotive vehicles in smog-infested districts deteriorate more rapidly than elsewhere due to oxidation by the ozone entrained in the smog particles of the atmosphere. The hardening and cracking of rubber covering on electrical conducting wires exposed to sunlight, and similar effects in windshield wipers and the like of automobiles where there is much exposure to sunlight are other examples of rapid deterioration with present day rubber products. By no means the least disadvantage with present day antioxidants is the fact that no single antioxidant chemical heretofore used will effect any substantial remedy against all or even a majority of the several different difficulties which attend the aging of rubber products. To overcome certain of the difficulties rubber compounders use a one certain antioxidant chemical, and against another difficulty they must often resort to a different chemical, or employ a combination of chemicals.

It is an object of this invention to provide an antioxidant for vulcanized rubber and rubber-like material, both natural and synthetic, which is to a high degree nonextractable from the rubber by various fluids to which the rubber products are exposed, such as oils, alcohol, hydraulic fluids, etc.; and thus to avoid the contamination of such fluids by their use with rubber products.

Another object is to provide an antioxidant in vulcanized rubber products which renders the product highly resistant to discoloration and other changes resulting from a photo-chemical effect.

Another object is to provide an antioxidant that will give increased life to rubber products which are subjected to extensive stretching, flexing and other such stress and strain, or are subjected to heat or to sunlight and to ozone.

Still another object of my invention is to provide in a vulcanized rubber composition, made with either natural or synthetic rubber, a single antioxidant chemical which renders the composition resistant to a very substantial number of the several deteriorating effects encountered in the aging of rubber products, thereby avoiding the necessity of having to provide different antioxidant chemicals for overcoming different deteriorating effects, such as one certain chemical for a certain difficulty and another chemical, for another difficulty.

These and other objects of the invention will be apparent from the ensuing description and the appended claims.

I have discovered that the deterioration which attends the aging of rubber can be greatly reduced and the useful life of rubber products greatly increased by incorporating in the rubber as an antioxidant a metal hydride which is a solid at ordinary temperatures and one that is stable against dissociation or decomposition under the conditions encountered during the processing of the rubber stock, i.e., throughout the mixing cycle and vulcanization. Metal hydrides which are ordinarily gaseous or liquid are not suitable. The liquid hydrides, for example, would evaporate and/or decompose. Among those that are ordinarily in solid form, certain ones, such as those of copper and manganese, I do not employ, it being well known that the compounds of copper and manganese in general are poisonous to rubber. As to certain others, such as arsenic, although the hydrides thereof ordinarily are in solid form, there are compounds of the metals which are poisonous to humans and I do not employ the hydrides of those metals where the compounds thereof that may be encountered may give rise to adverse physiological effects. Other of the solid metal hydrides are easily ignitable and must be kept in an atmosphere of inert gas, such as nitrogen, cerium hydride being one such. Others which may be free from these objectionable features are of such rare metals that their cost is prohibitive. In general I select those that, in addition to being compatible with the rubber composition, have the greatest atmospheric (air) stability and lend themselves to normal handling for uniform incorporation into the mass of rubber material during regular mixing operations. For this reason those which can be ground to a fine powder are selected.

In accordance with these criteria, metal hydrides which I have found most suitable as rubber antioxidants are calcium hydride ($CaH_2$), sodium hydride (NaH), titanium hydride ($TiH_2$) and zirconium hydride ($ZrH_2$).

By way of illustration of rubber compositions containing my antioxidants, the following specific examples are provided. Along with these examples, for comparison, there are given the same rubber compositions containing present day commercial antioxidants, the present day type compositions being in Column A and those with my antioxidants in Column B. Various of the ingredients in the composition are listed under the names by which they are known in the rubber compounding trade, but along with such names are given their function, i.e., whether they are accelerators, plasticizers, antioxidants, etc.

The chemical names of such designated ingredients as are used in a given example are set forth following the listing of the physical properties of the rubber composition of that example.

Shown also in the following examples are physical properties of the rubber compositions both before and after aging, accelerated tests, at the temperatures shown, having been used to age the compositions. In testing for these properties standard methods were employed, modulus being the force in pounds necessary to stretch a piece one square inch in cross section to 300% of its original length; elongation being the "ultimate elongation" or "elongation at break" expressed as percent of original length, etc.

EXAMPLE 1

*Natural rubber*

|  | Parts by weight | |
|---|---|---|
|  | Column A | Column B |
| Smoked sheet rubber | 100.00 | 100.00 |
| Stearic acid (activator) | 0.50 | 0.50 |
| Agerite Resin D (antioxidant) | 2.00 | None |
| Titanium hydride (antioxidant) | None | 0.50 |
| Zinc oxide (filler) | 75.00 | 75.00 |
| Whiting (filler) | 75.00 | 75.00 |
| Tetramethyl thiuram disulfide (accelerator) | 1.50 | 1.50 |
| Captax (vulcanization accelerator) | 0.50 | 0.50 |
| Zinc dimethyl dithio carbamate (accelerator) | 3.00 | 3.00 |
| Elemental tellurium (curing agent) | 3.00 | 3.00 |

CURE: 15 MINUTES AT 300° F.—PHYSICAL PROPERTIES

| Unaged: | | |
|---|---|---|
| Modulus at 300% (p.s.i.) | 164 | 193 |
| Tensile strength (p.s.i.) | 1,263 | 1,351 |
| Elongation (percent) | 643 | 653 |
| Shore "A" hardness | 30.0 | 29.5 |
| Air Aged 5 days at 100° C.: | | |
| Modulus | 364 | 350 |
| Tensile strength | 1,634 | 1,712 |
| Elongation (percent) | 550 | 616 |
| Shore "A" hardness | 35.0 | 33.0 |

Agerite Resin D is a trade name for polymerized trimethyl dihydroquinoline.
Captax is a trade name for mercaptobenzothiazole.

EXAMPLE 2

*Butadiene-acrylonitrile rubber*

|  | Parts by weight | |
|---|---|---|
|  | Column A | Column B |
| "Paracril-C" (based polymer) | 100.00 | 100.00 |
| Stearic acid (activator) | 1.00 | 1.00 |
| "Aminox" (antioxidant) | 1.50 | None |
| Titanium hydride (antioxidant) | None | 0.50 |
| Zinc oxide (activator) | 5.00 | 5.00 |
| "SRF carbon black" (filler) | 75.00 | 75.00 |
| Dibutyl phthalate (softener) | 20.00 | 20.00 |
| "MBTS" (accelerator) | 1.50 | 1.50 |
| Sulfur (vulcanizing agent) | 1.50 | 1.50 |

CURE: 20 MINUTES AT 300° F.—PHYSICAL PROPERTIES

| Unaged: | | |
|---|---|---|
| Modulus at 300% (p.s.i.) | 1,420 | 1,400 |
| Tensile strength (p.s.i.) | 2,560 | 2,610 |
| Elongation (percent) | 560 | 520 |
| Shore "A" hardness | 60 | 62 |
| Air Aged 120 hours at 212° F.: | | |
| Tensile strength (p.s.i.) | 2,700 | 2,680 |
| Elongation (percent) | 320 | 350 |
| Shore "A" hardness | 67 | 65 |

"Paracril-C" is a highly oil-resistant nitrile type of base polymer for a rubber having fairly low-temperature flexibility.
"Aminox" is a dimethylamine-acetone reaction product used as a rubber antioxidant.
"SRF carbon black" is an abbreviation for semi reinforcing furnace black, one of the various types of carbon black well known and accepted by compounders in the rubber industry as a filler.
"MBTS" is a term used for benzothiazyl disulfide, used as a rubber vulcanization accelerator.

EXAMPLE 3

*Butadiene-acrylonitrile rubber*

|  | Parts by weight | |
|---|---|---|
|  | Column A | Column B |
| "Paracril-BJ" (base polymer) | 100.00 | 100.00 |
| Zinc oxide (activator) | 5.00 | 5.00 |
| "Aminox" (antioxidant) | 1.50 | None |
| Calcium hydride (antioxidant) | None | 0.50 |
| Stearic acid (activator) | 1.00 | 1.00 |
| "SRF carbon black" (filler) | 50.00 | 50.00 |
| Tributoxyethyl phosphate (softener) | 12.50 | 12.50 |
| "Plasticizer-SC" (softener) | 12.50 | 12.50 |
| "MBTS" (accelerator) | 3.00 | 3.00 |
| "Tuex" (accelerator) | 3.00 | 3.00 |
| Sulfur (vulcanizing agent) | 0.20 | 0.20 |

CURE: 20 MINUTES AT 310° F.—PHYSICAL PROPERTIES

| Unaged: | | |
|---|---|---|
| Modulus at 300% (p.s.i.) | 600 | 620 |
| Tensile strength (p.s.i.) | 1,000 | 980 |
| Elongation (percent) | 450 | 470 |
| Shore "A" hardness | 40 | 40 |
| Air Aged 96 hours at 250° F.: | | |
| Tensile strength (p.s.i.) | 1,180 | 1,200 |
| Elongation (percent) | 350 | 370 |
| Shore "A" hardness | 44 | 45 |

"Paracril-BJ" is a medium oil-resistant nitrile type of base polymer for a rubber with a moderate low-temperature flexibility.
"Aminox" is defined hereinabove under Example 2.
"SRF carbon black" is defined hereinabove under Example 2.
"Plasticizer-SC" is a glycol ester of vegetable oil fatty acid.
"MBTS" is defined hereinabove under Example 2.
"Tuex" is tetramethyl thiuram disulfide.

EXAMPLE 4

*Butadiene-acrylonitrile rubber*

|  | Parts by weight | |
|---|---|---|
|  | Column A | Column B |
| "Hycar 1012" (base polymer) | 100.00 | 100.00 |
| Zinc oxide (activator) | 5.00 | 5.00 |
| Stearic acid (activator) | 1.00 | 1.00 |
| "MT carbon black" (filler) | 60.00 | 60.00 |
| "MPC carbon black" (filler) | 70.00 | 70.00 |
| Tributoxyethyl phosphate (softener) | 8.00 | 8.00 |
| "Paraflux" (softener) | 7.00 | 7.00 |
| "Permalux" (antioxidant) | 5.00 | None |
| "Agerite white" (antioxidant) | 3.00 | None |
| Sodium hydride (antioxidant) | None | 1.00 |
| Sulfur | 0.20 | 0.20 |

CURE: 30 MINUTES AT 310° F.—PHYSICAL PROPERTIES

| Unaged: | | |
|---|---|---|
| Tensile strength (p.s.i.) | 2,090 | 2,120 |
| Elongation (percent) | 350 | 360 |
| Shore "A" hardness | 70 | 71 |
| Air Aged 70 hours at 212° F.: | | |
| Tensile strength (p.s.i.) | 2,070 | 2,100 |
| Elongation (percent) | 300 | 330 |
| Shore "A" hardness | 75 | 74 |

"Hycar 1012" is a medium oil-resistant nitrile type of base polymer (copolymer of butadiene and acrylonitrile).
"MT carbon black" is an abbreviation for medium thermal black, one of the various types of carbon black well known and accepted by compounders in the rubber industry as a filler.
"MPC carbon black" is an abbreviation for medium processing channel black, another of the various types of carbon black well known and accepted by compounders in the rubber industry as a filler.
"Paraflux" is an asphaltic flux product used for rubber plasticising and rubber reclaiming.
"Permalux" is diorthotolyl guanidine salt of dicatechol borate.
"Agerite white" is symmetrical dibetanaphthyl paraphenylene diamine.

EXAMPLE 5

*Butadiene-styrene rubber*

| | Parts by weight | |
|---|---|---|
| | Column A | Column B |
| "GR-S 1006" (base polymer) | 100.00 | 100.00 |
| "Bondogen" (plasticizer) | 2.00 | 2.00 |
| Stearic acid (activator) | 1.00 | 1.00 |
| Zinc oxide (filler and activator) | 50.00 | 50.00 |
| Mineral rubber (diluent) | 30.00 | 30.00 |
| Whiting (filler) | 50.00 | 50.00 |
| Clay (filler) | 75.00 | 75.00 |
| "Agerite white" (antioxidant) | 2.00 | None |
| "Agerite resin-D" (antioxidant) | 1.00 | None |
| Calcium hydride (antioxidant) | None | 0.50 |
| "Altax" (accelerator) | 1.00 | 1.00 |
| "Bismate" (accelerator) | 3.00 | 3.00 |
| Sulfur (vulcanizing agent) | 0.75 | 0.75 |

CURE: 10 MINUTES AT 340° F.—PHYSICAL PROPERTIES

| | | |
|---|---|---|
| Unaged: | | |
| Modulus at 300% (p.s.i.) | 350 | 350 |
| Tensile strength (p.s.i.) | 1,150 | 1,200 |
| Elongation (percent) | 780 | 750 |
| Shore "A" hardness | 70 | 70 |
| Air Aged 96 hours at 250° F.: | | |
| Tensile strength (p.s.i.) | 1,020 | 1,050 |
| Elongation (percent) | 530 | 530 |
| Shore "A" hardness | 75 | 74 |

"GR-S 1006" means "Government Rubber-Styrene" and is the designation for one of the butadienestyrene elastomeric copolymers formerly produced in U.S. Government-owned plants. These polymers were sold by the U.S. Government to industry through the Government-owned Rubber Reserve Corporation. Polymers of this type are now produced by private industry under various private brand designations.

"Bondogen" is a mixture of an oil-soluble sulfonic acid of high molecular weight with a hydrophobic alcohol of high boiling point, plus a paraffin oil and is used as a plasticizer and processing aid in the rubber industry.

"Mineral rubber" is a Gilsonite type of hydrocarbon used as an extender with rubber for purposes of cost reduction. It is an asphaltite found only in the United States in Utah and Colorado and is one of the purest (99.9) natural bitumens.

"Agerite white" and "Agerite Resin-D" are defined hereinabove under Examples 1 and 4.

"Altax" is benzothiazyl disulfide.

"Bismate" is bismuth dimethyl dithiocarbamate.

EXAMPLE 6

*Butadiene-styrene rubber*

| | Parts by weight | |
|---|---|---|
| | Column A | Column B |
| "GR-S 1503" (base polymer) | 100.00 | 100.00 |
| Stearic acid (activator) | 2.00 | 2.00 |
| Zinc oxide (activator) | 5.00 | 5.00 |
| "Dixie clay" (filler) | 100.00 | 100.00 |
| "Agerite stalite" (antioxidant) | 2.00 | None |
| Zirconium hydride (antioxidant) | None | 0.50 |
| "Cumate" (accelerator) | 0.25 | 0.25 |
| "Altax" (accelerator) | 1.50 | 1.50 |
| Sulfur | 2.00 | 2.00 |

CURE: 15 MINUTES AT 310° F.—PHYSICAL PROPERTIES

| | | |
|---|---|---|
| Unaged: | | |
| Modulus at 300% (p.s.i.) | 1,150 | 1,130 |
| Tensile strength (p.s.i.) | 2,270 | 2,230 |
| Elongation (percent) | 620 | 640 |
| Shore "A" hardness | 66 | 65 |
| Air Aged 120 hours at 212° F.: | | |
| Tensile Strength (p.s.i.) | 1,980 | 1,950 |
| Elongation (percent) | 390 | 400 |
| Shore "A" hardness | 72 | 72 |

"GR-S 1503" means "Government Rubber Styrene" and is the designation for another of the butadiene-styrene elastomeric copolymers formerly produced in U.S. Government-owned plants, the same as "GR-S 1006" explained hereinabove under Example 5.

"Dixie clay" is aluminum silicate (kaolin), taken from some area below the Mason-Dixon line.

"Agerite stalite" is an oxylated diphenyl amine.

"Cumate" is cupric dimethyl dithiocarbamate.

"Altax" is defined hereinabove under Example 5.

EXAMPLE 7

*Polychloroprene rubber*

| | Parts by weight | |
|---|---|---|
| | Column A | Column B |
| "Neoprene type-W" (base polymer) | 100.00 | 100.00 |
| Extra light magnesia (stabilizer) | 2.00 | 2.00 |
| "Aranox" (antioxidant) | 2.00 | None |
| "Neozone-D" (antioxidant) | 1.00 | None |
| Titanium hydride (antioxidant) | None | 1.00 |
| Stearic acid (activator) | 0.50 | 0.50 |
| "MT carbon black" (filler) | 58.00 | 58.00 |
| Dioctyl sebacate (softener) | 20.00 | 20.00 |
| Zinc oxide (vulcanizing agent) | 5.00 | 5.00 |
| "NA-22" (accelerator) | 0.35 | 0.35 |

CURE: 20 MINUTES AT 307° F.—PHYSICAL PROPERTIES

| | | |
|---|---|---|
| Unaged: | | |
| Modulus at 500% (p.s.i.) | 1,375 | 1,350 |
| Tensile strength (p.s.i.) | 2,200 | 2,140 |
| Elongation (percent) | 780 | 790 |
| Shore "A" hardness | 45 | 45 |
| Air Aged 168 hours at 250° F.: | | |
| Tensile strength (p.s.i.) | 1,650 | 1,710 |
| Elongation (percent) | 510 | 530 |
| Shore "A" hardness | 52 | 50 |

"Neoprene type W" is a chloroprene synthetic elastomer sold in the industry as a base polymer for a synthetic rubber.

"Aranox" is p-(p-toluene-sulfonyl-amido) diphenylamine.

"Neozone-D" is phenyl beta naphthylamine and is used as a rubber antioxidant.

"MT carbon black" is defined hereinabove under Example 4.

"NA-22" is 2-mercapto-imidazoline and is used as a vulcanization accelerator for neoprene.

EXAMPLE 8

*Butyl rubber*

| | Parts by weight | |
|---|---|---|
| | Column A | Column B |
| "Enjay butyl 325" (base polymer) | 100.00 | 100.00 |
| "Neoprene-GN" (modifier) | 5.00 | 5.00 |
| Stearic acid (activator) | 1.00 | 1.00 |
| Zinc oxide (stabilizer) | 20.00 | 20.00 |
| "Agerite superlite" (antioxidant) | 2.00 | None |
| "Agerite resin-D" (antioxidant) | 2.00 | None |
| Titanium hydride (antioxidant) | None | 2.00 |
| "MPC carbon black" (filler) | 25.00 | 25.00 |
| "SRF carbon black" (filler) | 25.00 | 25.00 |
| Sulfur (vulcanizing agent) | 2.00 | 2.00 |
| "Altax" (accelerator) | 2.00 | 2.00 |
| "Tellurac" (secondary vulcanizing agent) | 2.00 | 2.00 |

CURE: 45 MINUTES AT 307° F.—PHYSICAL PROPERTIES

| | | |
|---|---|---|
| Unaged: | | |
| Modulus at 300% (p.s.i.) | 1,570 | 1,550 |
| Tensile strength (p.s.i.) | 1,910 | 1,950 |
| Elongation (percent) | 370 | 370 |
| Shore "A" hardness | 67 | 66 |
| Air Aged 72 hours at 350° F.: | | |
| Tensile strength (p.s.i.) | 490 | 540 |
| Elongation (percent) | 120 | 140 |
| Shore "A" hardness | 73 | 73 |

"Enjay butyl 325" is an elastomeric copolymer of isobutylene and a small proportion of isoprene to give a controlled low degree of unsaturation.

"Neoprene-GN" is a chloroprene synthetic elastomer sold to the trade as a base polymer for synthetic rubber.

"Agerite superlite" is polyalkyl polyphenol.

"Agerite resin D," "MPC carbon black," "SRF carbon black" and "Altax" are defined hereinabove under Examples 1, 2, 4 and 5.

"Tellurac" is tellurium diethyl dithiocarbamate.

In all instances of the above examples the material was compounded and processed by standard procedure. The antioxidant ingredients were introduced into the mixture early in the mixing cycle so that they would have opportunity to function early in the process, the heat that is produced during the mixing process being conducive to increased oxidation of the rubber. The metal hydride is added to the rubber composition in powdered form.

Calcium hydride, for example, can be ground to a fineness to pass through a 300 mesh sieve, and titanium hydride is regularly supplied by a commercial firm at 325 mesh fineness. In all cases the material was vulcanized in molds under heat and pressure (about 750 p.s.i.) and formed into standard ASTM tensile sheets.

Of the four metal hydrides employed in the above illustrative examples I prefer the titanium hydride. While all of the four are stable against decomposition I have found it to be the most stable. With respect to the amount of hydrogen yieldable by it—it being a theory that free hydrogen liberated plays a part in the breaking up of the auto-oxidation chain of reactions through which the oxidation of rubber is assumed to take place—I have found that one gram of titanium hydride decomposed to the ultimate will yield 448 cubic centimers of hydrogen (measured under standard conditions of pressure and temperature).

In addition to the physical properties which are compared in the data of the foregoing examples there was a marked difference, after the products had been aged, in the color of the products produced with my metal hydrides. Both sets of products were of about the same grayish color when freshly produced except those in which carbon black was used as a filler, in which case they were black or of a dark color. But at the end of the aging test all of the products made with the present day antioxidants had turned to a decided brown color, particularly on all surfaces exposed to the atmosphere, whereas those made with the metal hydrides retained substantially their original gray color. And when samples from both sets of products were stretched the surface cracks were markedly deeper and larger in area in the products made with the present day antioxidants than in those made with the metal hydrides.

With respect to the physical characteristics compared by the test data set forth in the above examples—modulus, elongation, etc.—it will be observed that in substantially all instances the products made with the metal hydrides are at least on a par with those made with present day commercial antioxidants. Thus with my antioxidants the products are superior in some respects and substantially as good in the other respects.

With respect to other behavior characteristics the products made with the metal hydrides are found to have a marked improvement over those made with present day commercial antioxidants when in contact with various liquids such as oils and alcohols, with respect to the extractability of the antioxidant chemical from the rubber composition by the said liquid.

These comparisons bring out an important feature of my invention, namely, that substantially all of the meritorious qualities in rubber products as measured by to-day's achievements can be produced with a single chemical as the antioxidant, whereas with the antioxidants as heretofore used some are found to be more efficient for certain characteristics and others for different characteristics, thus causing the trade in today's practice to use different antioxidant chemicals for different ends and/or to use two or more in combination in the same rubber product. By comparison it may be said that the metal hydrides afford an all-purpose antioxidant, so to speak.

The amount of metal hydride that may be employed in the rubber composition may vary within wide limits, and is not critical. It must be borne in mind that the amount of oxidation or deterioration upon the aging of rubber depends upon a variety of circumstances, particularly the amount of exposure to oxygen, ozone, ultraviolet light as in sunlight and such like. A rubber product used in the dark and at relatively low temperatures will generally not deteriorate so rapidly as in heat and/or sunlight. I have had good results with as low as 0.25 part by weight per 100 parts of rubber (base ingredient) in the composition. For mild conditions of oxidation as low as 0.10 part per 100 parts of rubber will suffice. My work indicates that it may not be necessary, at least for average conditions, to go beyond 5.0 parts of the metal hydride per 100 parts of base rubber stock in the composition.

As a preliminary step preceding the introduction of the metal hydride into the mass of rubber material while the latter is being processed I have found it advantageous to coat the powdered metal hydride particles with a material which is compatible with the rubber stock, such as a refined petroleum oil known generally as Russian mineral oil or white mineral oil and sold under the trade name Nujol. A substance of this nature is in fact sometimes used in rubber compounding as a softener for the rubber. I mix the powdered hydride and oil together to the consistency of a thick paste and then introduce this paste into the rubber stock early in the regular mixing cycle generally as practiced in preparing a rubber stock. A primary object in this step is to coat the metal hydride particles and thereby keep the oxygen of the atmosphere out of contact with them so as to avoid undue oxidation. There is, also an advantage in the handling of the hydride as it is fed into the rubber stock, especially in instances where it may come in contact with the hands of the operator. It helps to avoid a skin irritation or other physiological effect that may sometimes result from the handling of the metal hydride. By forming a dispersion of the hydride in the oil or similar substance its direct contact with the skin is substantially avoided. The amount of oil or other coating material to be used is not critical. The amount required to form a paste of convenient consistency is well below that which would have any undue softening effect upon the rubber stock. Moreover, the object of preventing oxidation by the oxygen from the atmosphere prior to and during the mixing into the rubber stock is accomplished whether the paste be thin or thick. Convenience in introducing the paste into the mixing mass is therefore the criterion as to the amount of oil to be used in this step of pre-coating the metal hydride particles. A consistency of very thick cream or that of thin, but still semi-solid, butter may suffice. Another guide is to mix the paste to the consistency of thick petrolatum, petroleum jelly or Vaseline. In fact these latter substances and such substances as liquid paraffin may be employed in lieu of the aforesaid oil in pre-coating the hydride particles, the metal hydride being stirred into the petrolatum, or other substance, until a good dispersion therein of the powdered hydride is obtained. As a further guide for the consistency of the paste I have found that a convenient method for feeding the paste into the mass of rubber stock undergoing mixing is to place a quantity of the paste on a flat surface and then hold the said surface at a slight angle from the vertical and near enough to the mass of rubber stock in the mixing machine that the rubber stock comes in contact with the paste and gradually sweeps it or pulls it from the said surface into the mass undergoing mastication. Thus a consistency of the paste that will permit its being retained on the tilted surface will suffice. Obviously the angle at which the said surface is held from the vertical may and will vary with different operators—a fact which well illustrates that the amount of oil or other coating substance in proportion to the amount of powdered metal hydride may vary with wide limits. Such a pre-coating step may or may not be practiced, depending on the extent to which it is desired to stabilize against decomposition of the hydride through exposure to air and against adverse physiological effects that might ensue in the handling of the hydride.

The following specific examples are given as illustrative of the coating of the metal hydrides:

| Example | Metal Hydride Pastes | Grams |
|---|---|---|
| 9 | Titanium hydride | 100.00 |
|   | Paraffine oil (Nujol) | 15.00 |
| 10 | Titanium hydride | 100.00 |
|   | Rubbermakers petrolatum (Melted at 120° F.) | 25.00 |
| 11 | Calcium hydride | 100.00 |
|   | 126° Paraffine (Melted at 130° F.) | 20.00 |
| 12 | Sodium hydride | 100.00 |
|   | Paraffine oil (Nujol) | 20.00 |
| 13 | Zirconium hydride | 100.00 |
|   | Rubbermakers petrolatum (Melted at 120° F.) | 25.00 |
| 14 | Calcium hydride | 100.00 |
|   | Rubbermakers petrolatum (Melted at 120° F.) | 50.00 |
| 15 | Sodium hydride | 100.00 |
|   | 126° Paraffine (Melted at 130° F.) | 50.00 |

While I have shown preferred examples of my invention, it is to be understood that various changes may be made in its application by those skilled in the art without departing from the spirit of the invention as defined in the appended claims.

Having thus described my invention, what I claim and desire to secure by Letters Patent is:

I claim:
1. A vulcanized rubber product containing as an antioxidant a hydride selected from the group consisting of sodium hydride, calcium hydride, titanium hydride and zirconium hydride; said hydride being uniformly dispersed throughout said product and being present in an amount from 0.10 part to 5.0 parts by weight per 100 parts by weight of the rubber ingredient of said product.

2. The product of claim 1 in which the said hydride is titanium hydride.

3. The product of claim 1 in which the said hydride is zirconium hydride.

4. The product of claim 1 in which said hydride is dispersed in powdered form in a medium selected from the group consisting of white mineral oil, paraffin oil, and petrolatum.

References Cited in the file of this patent
UNITED STATES PATENTS
2,252,318    Gravell _____ Aug. 12, 1941

OTHER REFERENCES

"Industrial and Engineering Chemistry," volume 18, No. 7, July 1926, pages 691–694.

"Merck's Index," 6th edition, Merck & Company, 1952, pages 187, 880, 1024 and 1025 relied on.